United States Patent
Zhamu et al.

(10) Patent No.: US 10,651,464 B2
(45) Date of Patent: May 12, 2020

(54) ALKALI METAL-SULFUR SECONDARY BATTERY CONTAINING A NANO SULFUR-LOADED CATHODE AND MANUFACTURING METHOD

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 473 days.

(21) Appl. No.: 15/431,231

(22) Filed: Feb. 13, 2017

(65) Prior Publication Data

US 2018/0233784 A1 Aug. 16, 2018

(51) Int. Cl.
| H01M 4/38 | (2006.01) |
| H01M 4/62 | (2006.01) |
| H01M 4/58 | (2010.01) |
| H01M 10/052 | (2010.01) |
| H01M 4/02 | (2006.01) |

(52) U.S. Cl.
CPC .............. *H01M 4/382* (2013.01); *H01M 4/38* (2013.01); *H01M 4/381* (2013.01); *H01M 4/5815* (2013.01); *H01M 4/625* (2013.01); *H01M 10/052* (2013.01); *H01M 2004/028* (2013.01)

(58) Field of Classification Search
None
See application file for complete search history.

(56) References Cited

U.S. PATENT DOCUMENTS

| 2,798,878 A | 7/1957 | Hummers |
| 2005/0271574 A1 | 12/2005 | Jang et al. |
| 2012/0088154 A1 | 4/2012 | Liu et al. |
| 2013/0171339 A1 | 7/2013 | Wang et al. |
| 2014/0234702 A1 | 8/2014 | Zhamu et al. |
| 2016/0240841 A1 | 8/2016 | He et al. |
| 2016/0294000 A1* | 10/2016 | He .................. H01M 10/0525 |

OTHER PUBLICATIONS

Xiulei Ji, Kyu Tae Lee, & Linda F. Nazar, "A highly ordered nanostructured carbon-sulphur cathode for lithium-sulphur batteries," Nature Materials 8, 500-506 (2009).
PCT/US18/16376 International Search Report and Written Opinion dated Apr. 30, 2018, 9 pages.

* cited by examiner

*Primary Examiner* — Carmen V Lyles-Irving

(57) ABSTRACT

A rechargeable alkali metal-sulfur cell selected from lithium-sulfur cell, sodium-sulfur cell, or potassium-sulfur cell The alkali metal-sulfur cell comprises an anode active material layer, an optional anode current collector supporting the anode active material layer, a cathode active material layer, an electrolyte with an optional porous separator layer in ionic contact with the anode active material layer and the cathode active material layer, and an optional cathode current collector supporting the cathode active material layer, wherein the cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in these expanded inter-graphene planar spaces. This battery exhibits an excellent combination of high sulfur content, high sulfur utilization efficiency, high energy density, and long cycle life.

46 Claims, 8 Drawing Sheets

ALKALI METAL-SULFUR SECONDARY BATTERY CONTAINING A NANO SULFUR-LOADED CATHODE AND MANUFACTURING METHOD

FIELD OF THE INVENTION

The present invention provides a unique cathode composition and structure in a secondary or rechargeable alkali metal-sulfur battery, including the lithium-sulfur battery, sodium-sulfur battery, and potassium-sulfur battery. The lithium-sulfur battery can include the lithium metal-sulfur battery (having lithium metal as the anode active material and sulfur as the cathode active material) and the lithium ion-sulfur battery (e.g. Si or graphite as the anode active material and sulfur as the cathode active material). The sodium-sulfur battery can include the sodium metal-sulfur battery (having sodium metal as the anode active material and sulfur as the cathode active material) and the sodium ion-sulfur battery (e.g. hard carbon as the anode active material and sulfur as the cathode active material).

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16Li \leftrightarrow 8Li_2S$ that lies near 2.2 V with respect to $Li^+/Li^0$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weight or volume. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-400 Wh/kg (based on the total cell weight), which is far below what is possible.

In summary, despite its considerable advantages, the Li—S cell is plagued with several major technical problems that have thus far hindered its widespread commercialization:

(1) Conventional lithium metal cells still have dendrite formation and related internal shorting issues.
(2) Sulfur or sulfur-containing organic compounds are highly insulating, both electrically and ionically. To enable a reversible electrochemical reaction at high current densities or charge/discharge rates, the sulfur must maintain intimate contact with an electrically conductive additive. Various carbon-sulfur composites have been utilized for this purpose, but only with limited success owing to the limited scale of the contact area. Typical reported capacities are between 300 and 550 mAh/g (based on the cathode carbon-sulfur composite weight) at moderate rates.
(3) The cell tends to exhibit significant capacity decay during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator to the Li negative electrode whereupon they are reduced to solid precipitates ($Li_2S_2$ and/or $Li_2S$), causing active mass loss. In addition, the solid product that precipitates on the surface of the positive electrode during discharge becomes electrochemically irreversible, which also contributes to active mass loss.

(4) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications.

For instance, Ji, et al reported that cathodes based on nanostructured sulfur/meso-porous carbon materials could overcome these challenges to a large degree, and exhibit stable, high, reversible capacities with good rate properties and cycling efficiency [Xiulei Ji, Kyu Tae Lee, & Linda F. Nazar, "A highly ordered nanostructured carbon-sulphur cathode for lithium-sulphur batteries," *Nature Materials* 8, 500-506 (2009)]. However, the fabrication of the proposed highly ordered meso-porous carbon structure requires a tedious and expensive template-assisted process. It is also challenging to load a large proportion of sulfur into these meso-scaled pores using a physical vapor deposition or solution precipitation process.

Zhang, et al. (US Pub. No. 2014/0234702; Aug. 21, 2014) makes use of a chemical reaction method of depositing S particles on surfaces of isolated graphene oxide (GO) sheets. But, this method is incapable of creating a large proportion of ultra-small S particles on GO surfaces (i.e. typically <66% of S in the GO-S nanocomposite composition). The resulting Li—S cells also exhibit poor rate capability; e.g. the specific capacity of 1,100 mAh/g (based on S weight) at 0.02 C rate is reduced to <450 mAh/g at 1.0 C rate. It may be noted that the highest achievable specific capacity of 1,100 mAh/g represents a sulfur utilization efficiency of only 1,100/1,675=65.7% even at such a low charge/discharge rate (0.02 C means completing the charge or discharge process in 1/0.02=50 hours; 1 C=1 hour, 2 C=½ hours, and 3 C=⅓ hours, etc.) Further, such a S-GO nanocomposite cathode-based Li—S cell exhibits very poor cycle life, with the capacity typically dropping to less than 60% of its original capacity in less than 40 charge/discharge cycles. Such a short cycle life makes this Li—S cell not useful for any practical application. Another chemical reaction method of depositing S particles on graphene oxide surfaces is disclosed by Wang, et al. (US Pub. No. 2013/0171339; Jul. 4, 2013). This Li—S cell still suffers from the same problems.

A solution precipitation method was disclosed by Liu, et al. (US Pub. No. 2012/0088154; Apr. 12, 2012) to prepare graphene-sulfur nanocomposites (having sulfur particles adsorbed on GO surfaces) for use as the cathode material in a Li—S cell. The method entails mixing GO sheets and S in a solvent ($CS_2$) to form a suspension. The solvent is then evaporated to yield a solid nanocomposite, which is then ground to yield nanocomposite powder having primary sulfur particles with an average diameter less than approximately 50 nm. Unfortunately, this method does not appear to be capable of producing S particles less than 40 nm. The resulting Li—S cell exhibits very poor cycle life (a 50% decay in capacity after only 50 cycles). Even when these nanocomposite particles are encapsulated in a polymer, the Li—S cell retains less than 80% of its original capacity after 100 cycles. The cell also exhibits a poor rate capability (specific capacity of 1,050 mAh/g (S wt.) at 0.1 C rate, dropped to <580 mAh/g at 1.0 C rate). Again, this implies that a large proportion of S did not contribute to the lithium storage, resulting in a low S utilization efficiency.

Furthermore, all of the aforementioned methods involve depositing S particles onto surfaces of isolated graphene sheets. The presence of S particles (one of the most insulating materials) adhered to graphene surfaces would make the resulting electrode structure non-conducting when multiple S-bonded graphene sheets are packed together. These S particles prevent graphene sheets from contacting each other, making it impossible for otherwise conducting graphene sheets to form a 3-D network of electron-conducting paths in the cathode. This unintended and unexpected outcome is another reason why these prior art Li—S cells have performed so poorly.

Despite the various approaches proposed for the fabrication of high energy density Li—S cells, there remains a need for cathode materials, production processes, and cell operation methods that retard the out-diffusion of S or lithium polysulfide from the cathode compartments into other components in these cells, improve the utilization of electro-active cathode materials (S utilization efficiency), and provide rechargeable Li—S cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-sulfur secondary battery if dendrite related issues could be addressed.

Sodium metal (Na) and potassium metal (K) have similar chemical characteristics to Li and the sulfur cathode in room temperature sodium-sulfur cells (RT Na—S batteries) or potassium-sulfur cells (K—S) face the same issues observed in Li—S batteries, such as: (i) low active material utilization rate, (ii) poor cycle life, and (iii) low Coulombic efficiency. Again, these drawbacks arise mainly from insulating nature of S, dissolution of S and Na or K polysulfide intermediates in liquid electrolytes (and related Shuttle effect), and large volume change during charge/discharge.

Hence, an object of the present invention is to provide a rechargeable alkali metal battery (e.g Li—S, Na—S, and K—S battery) that exhibits an exceptionally high specific energy or high energy density. One particular technical goal of the present invention is to provide an alkali metal-sulfur or alkali ion-sulfur cell with a cell specific energy greater than 400 Wh/Kg, preferably greater than 500 Wh/Kg, and more preferably greater than 600 Wh/Kg (all based on the total cell weight).

Another object of the present invention is to provide an alkali metal-sulfur cell that exhibits a high cathode specific capacity (higher than 1,200 mAh/g based on the sulfur weight, or higher than 1,000 mAh/g based on the cathode composite weight, including sulfur, conducting additive or substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, and a long and stable cycle life.

It may be noted that in most of the open literature reports (scientific papers) and patent documents, scientists or inventors choose to express the cathode specific capacity based on the sulfur or lithium polysulfide weight alone (not the total cathode composite weight), but unfortunately a large proportion of non-active materials (those not capable of storing lithium, such as conductive additive and binder) is typically used in their Li—S cells. For practical use purposes, it is more meaningful to use the cathode composite weight-based capacity value.

A specific object of the present invention is to provide a rechargeable alkali metal-sulfur cell based on rational materials and battery designs that overcome or significantly reduce the following issues commonly associated with conventional Li—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or alkali metal polysulfides); (c) dissolution of S and alkali metal polysulfide in electrolyte and migration of polysulfides from the cathode to the anode (which irreversibly react with lithium, or Na or K at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential alkali metal dendrite-induced internal short circuit and thermal runaway problems in Li metal-sulfur batteries.

SUMMARY OF THE INVENTION

The present invention provides an alkali metal-sulfur cell (e.g. lithium-sulfur cell, sodium-sulfur cell, and potassium-sulfur cell). Such a battery cell contains an ultra-thin sulfur (S) coating layer or ultra-small small S particles (<2.0 nm) in a graphite or carbon material-based cathode having a large proportion of S (the cathode active material) relative to the supporting host (graphite or carbon material structure). The ultra-thin dimensions also enable high storing/releasing rates of alkali metal ions ($Li^+$, $Na^+$, and/or $K^+$) and, hence, exceptional rate capability or power density.

The rechargeable alkali metal-sulfur cell (a lithium-sulfur cell, sodium-sulfur cell, or potassium-sulfur cell) comprises an anode active material layer, an optional anode current collector supporting the anode active material layer, a cathode active material layer, an electrolyte with an optional porous separator layer in ionic contact with the anode active material layer and the cathode active material layer, and an optional cathode current collector supporting the cathode active material layer, wherein the cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in the expanded inter-graphene planar spaces.

In certain embodiments, the metal polysulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. Preferably, the metal element M is selected from Li, Na, K, Mg, Zn, Cu, Ti, Ni, Co, Fe, or Al. Further preferably, the metal polysulfide contains $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

The carbon or graphite material in said cathode active material layer may be selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after the expansion treatment.

In certain embodiments, in rechargeable alkali metal-sulfur cell, the carbon or graphite material is selected from graphite foam or graphene foam having pores and pore walls, wherein the pore walls contain a stack of bonded graphene planes having an expanded inter-planar spacing $d_{002}$ from 0.45 nm to 1.5 nm. Preferably, the stack contains from 2 to 100 graphene planes.

In the invented rechargeable alkali metal-sulfur cell, the inter-planar spacing $d_{002}$ may be from 0.5 nm to 1.2 nm. Preferably, the inter-planar spacing $d_{002}$ is from 1.2 nm to 2.0 nm.

In some preferred embodiments, the expansion treatment may include an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material. These expansion treatments may be further followed by a constrained thermal expansion treatment to increase the d spacing from a more typical range of 0.5-1.2 nm to a range of 1.2-2.0 nm.

The carbon or graphite material may contain a non-carbon element selected from oxygen, fluorine, chlorine, bromine, iodine, nitrogen, hydrogen, or boron.

The presently invented rechargeable alkali metal-sulfur cell typically has a sulfur utilization efficiency greater than 85%, more typically greater than 90%.

The present invention also provides a cathode active material layer for a rechargeable alkali metal-sulfur cell. This cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in these expanded inter-graphene planar spaces.

The metal polysulfide preferably contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. The metal element M may be selected from Li, Na, K, Mg, Zn, Cu, Ti, Ni, Co, Fe, or Al. In the cathode active material layer, the metal polysulfide preferably contains $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

The carbon or graphite material in said cathode active material layer may be selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, carbon aerogel, carbon xerogel, or a combination thereof, wherein the carbon or graphite material has an inter-planar spacing $d_{002}$ from 0.27 nm to 0.42 nm prior to a chemical or physical expansion treatment and the inter-planar spacing $d_{002}$. is increased to from 0.43 nm to 2.0 nm after this expansion treatment.

In certain preferred embodiments, the carbon or graphite material in the cathode active layer is selected from graphite foam or graphene foam having pores and pore walls, wherein the pore walls contain a stack of bonded graphene planes having an expanded inter-planar spacing $d_{002}$ from 0.45 nm to 1.5 nm. Preferably, the stack contains from 2 to 100 graphene planes.

In certain embodiments, the inter-planar spacing $d_{002}$ is from 0.5 nm to 1.2 nm. In other embodiments, the inter-planar spacing $d_{002}$ is from 1.2 nm to 2.0 nm. The expansion treatment preferably includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. These treatments may be further followed by a constrained thermal expansion treatment. In the cathode active material layer, the carbon or graphite material contains a non-carbon element selected from oxygen, fluorine, chlorine, bromine, iodine, nitrogen, hydrogen, or boron.

In the rechargeable alkali metal-sulfur cell, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof.

In certain embodiments, the electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate ($LiCF_3SO_3$), bis-trifluoromethyl sulfonylimide lithium ($LiN(CF_3SO_2)_2$), Lithium bis(oxalato)borate (Li-BOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent in the electrolyte may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In the rechargeable alkali metal-sulfur cell, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

In some embodiments, the rechargeable alkali metal-sulfur cell is a lithium ion-sulfur cell and the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

In certain embodiments, the rechargeable alkali metal-sulfur cell is a sodium ion-sulfur cell or potassium ion-sulfur cell and said anode active material layer contains an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, (d) Sodium or potassium salts; (e) particles of graphite, hard carbon, soft carbon or carbon particles and pre-sodiated versions thereof and combinations thereof.

In the presently invented rechargeable alkali metal-sulfur, the cathode active material layer has an active material utilization efficiency no less than 80%, preferably and more typically no less than 90%. The cathode active material layer contains at least 80% by weight (preferably at least 90%) of sulfur or metal polysulfide based on the total weight of said carbon or graphite material and the sulfur or metal polysulfide combined.

The present invention also provides a method of manufacturing a rechargeable alkali metal-sulfur cell. The method comprises:
  (a) providing an alkali metal selected from Li, Na, K, or a combination thereof;
  (b) providing a cathode containing a carbon or graphite material having expanded inter-planar spaces, $d_{002}$ from 0.43 nm to 2.0 nm, and sulfur or metal polysulfide residing in the expanded inter-planar spaces; and (c) providing an electrolyte capable of transporting alkali metal ions.

Preferably, the step of providing a cathode contains impregnating the expanded inter-planar spaces with sulfur or metal polysulfide using a vapor phase infiltration procedure, liquid solution infiltration procedure, electrochemical procedure, chemical infiltration and deposition procedure, liquid dipping procedure, or a combination thereof. The electrochemical procedure is most effective and most preferred. Preferably, the electrochemical procedure includes:

(a) preparing an electrochemical cathode layer containing a carbon or graphite material having expanded inter-planar spaces, $d_{002}$ from 0.43 nm to 2.0 nm;
(b) preparing an electrolyte comprising a non-aqueous solvent and a sulfur source dissolved or dispersed in the solvent;
(c) preparing an anode; and
(d) bringing the electrochemical cathode layer and the anode in ionic contact with the electrolyte and imposing an electric current between the anode and the electrochemical cathode layer, with a sufficient current density for a sufficient period of time to electrochemically impregnate sulfur in the expanded spaces to form the cathode active material layer.

The sulfur source is preferably selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In this electrochemical procedure, the anode comprises an anode active material selected from an alkali metal, an alkaline metal, a transition metal, a metal from groups 13 to 17 of the periodic table, or a combination thereof. The metal element M is selected from Li, Na, K, Mg, Zn, Cu, Ti, Ni, Co, Fe, or Al. The sulfur source $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In the electrochemical procedure, the electrolyte may further comprise a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato) borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent used may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

Preferably, in the electrochemical method, the anode, the electrolyte, and the electrochemical cathode layer are disposed in an external container outside (an electrochemical reactor) of an alkali metal-sulfur cell and the step of electrochemically impregnating sulfur into the expanded spaces is conducted outside the alkali metal-sulfur cell.

Alternatively, this electrochemical impregnating procedure is conducted internally inside the intended battery cell. In this situation, the anode, the electrolyte, and the electrochemical cathode layer are disposed inside an alkali metal-sulfur cell and the step of electrochemically impregnating sulfur into the expanded spaces of the carbon or graphite material is conducted after the alkali metal-sulfur cell is fabricated.

More typically and preferably, the reversible specific capacity of the sulfur cathode is no less than 1,000 mAh per gram and often exceeds 1,200 or even 1,500 mAh per gram of entire cathode layer. The high specific capacity of the presently invented cathode, when in combination with a lithium anode, leads to a cell specific energy of no less than 600 Wh/Kg based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 500 Wh/Kg and, in some examples, exceeds 600 Wh/kg.

These and other advantages and features of the present invention will become more transparent with the description of the following best mode practice and illustrative examples.

DETAILED DESCRIPTION OF PREFERRED EMBODIMENTS

Figure 1A:
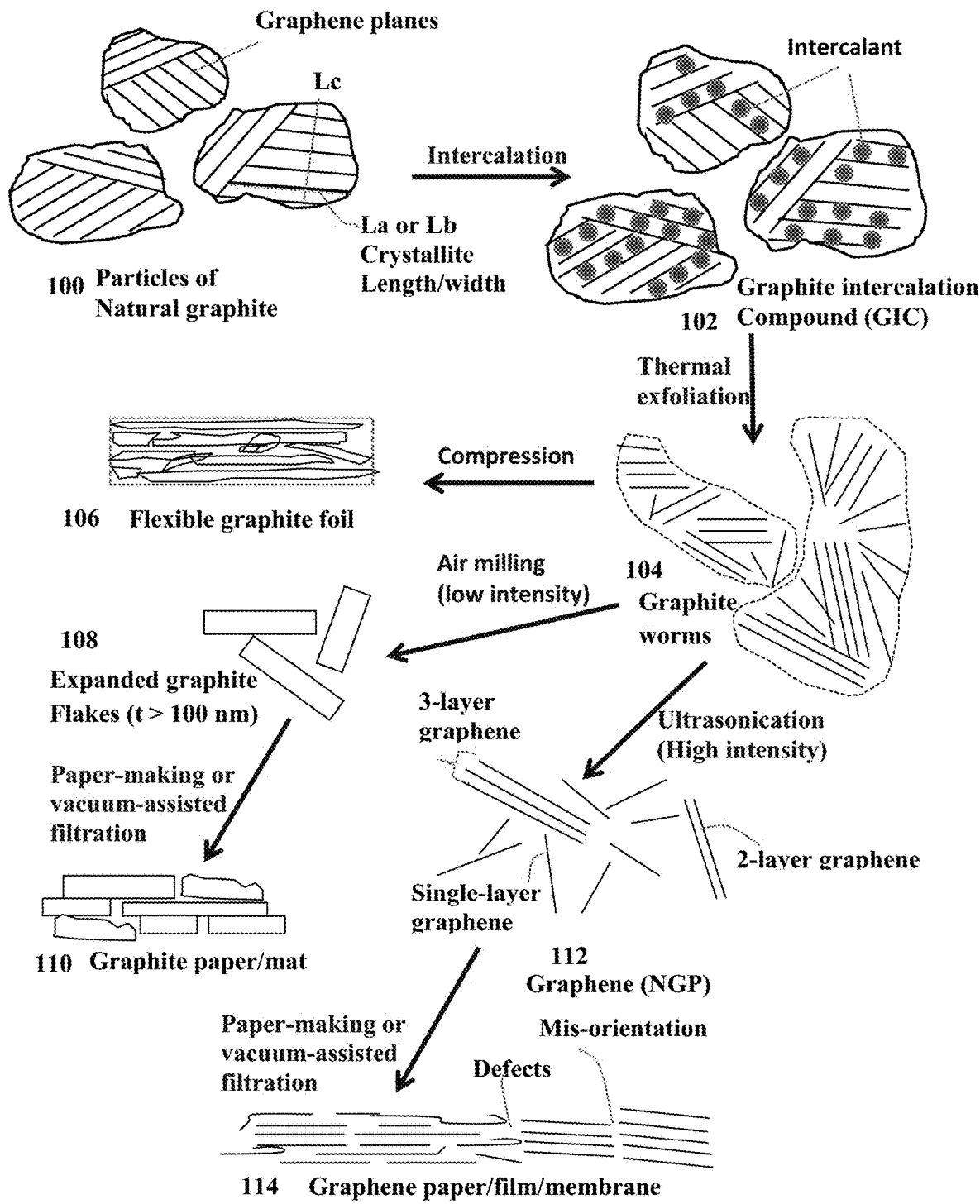
FIG. 1(A) Schematic drawing illustrating the processes for producing intercalated and/or oxidized graphite, subsequently exfoliated graphite worms, and conventional paper, mat, film, and membrane of simply aggregated graphite or graphene flakes/platelets.

For convenience, the following discussion of preferred embodiments is primarily based on cathodes for Li—S cells, but the same or similar structure or methods are applicable to impregnation of S in the cathode for the Na—S and K—S cells. Examples are presented for Li—S cells, room-temperature Na—S cells, and K—S cells.

It is important to note at the beginning of this section that a graphite or carbon material having expanded $d_{002}$ spacing between graphene planes (hexagonal carbon atom planes) is not equal or similar to the so-called "expanded graphite" in graphite industry. Expanded graphite is obtained by breaking up the constituent flakes of exfoliated graphite worms. Expanded graphite does not have an expanded $d_{002}$ spacing; instead, its $d_{002}$ spacing typically remains in the range of 0.335 nm-0.36 nm possessed by the original graphite material. This will be further discussed later.

A. Alkali Metal-Sulfur Cells (Using Lithium-Sulfur Cells as an Example)

The specific capacity and specific energy of a Li—S cell (or Na—S, or K—S cell) are dictated by the actual amount of sulfur that can be implemented in the cathode active layer (relative to other non-active ingredients, such as the binder resin and conductive filler) and the utilization rate of this sulfur amount (i.e. the utilization efficiency of the cathode active material or the actual proportion of S that actively participates in storing and releasing lithium ions). Using Li—S cell as an illustrative example, a high-capacity and high-energy Li—S cell requires a high amount of S in the cathode active layer (i.e. relative to the amounts of non-active materials, such as the binder resin, conductive additive, and other modifying or supporting materials) and a high S utilization efficiency). The present invention provides such a cathode active layer and a method of producing such a cathode active layer, which is a pre-sulfurized active cathode layer.

The invented rechargeable alkali metal-sulfur cell (a lithium-sulfur cell, sodium-sulfur cell, or potassium-sulfur cell) comprises an anode active material layer, an optional anode current collector supporting the anode active material layer, a cathode active material layer, an electrolyte with an optional porous separator layer in ionic contact with the anode active material layer and the cathode active material layer, and an optional cathode current collector supporting the cathode active material layer, wherein the cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in the expanded inter-graphene planar spaces.

The metal polysulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. Preferably, the metal element M is selected from Li, Na, K, Mg, Zn, Cu, Ti, Ni, Co, Fe, or Al. Further preferably, the metal polysulfide contains $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

The carbon or graphite material in the cathode active material layer may be selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, carbon aerogel, carbon xerogel, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after the expansion treatment. In the invented rechargeable alkali metal-sulfur cell, the inter-planar spacing $d_{002}$ may be from 0.5 nm to 1.2 nm. Preferably, the inter-planar spacing $d_{002}$ is from 1.2 nm to 2.0 nm.

In certain embodiments, in rechargeable alkali metal-sulfur cell, the carbon or graphite material is selected from graphite foam or graphene foam having pores and pore walls, wherein the pore walls contain a stack of bonded graphene planes having an expanded inter-planar spacing $d_{002}$ from 0.45 nm to 1.5 nm. Preferably, the stack contains from 2 to 100 graphene planes.

B. Production of Various Cathode Active Materials Having Expanded Inter-Planar Spaces As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$ typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range of 0.32-0.35 nm and do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 1(D). The presence of an intercalant, oxygen-containing group, or fluorine-containing group serves to increase the spacing between two graphene planes in a graphite crystallite. This inter-planar spacing may be further increased to become 1.2 nm-2.0 nm if the intercalated, oxidized, or fluorinated graphite is exposed to a moderate temperature (150-800° C.) under a constant-volume condition. This is herein referred to as a constrained expansion treatment.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.42-2.0 nm, more typically in the range of 0.5-1.2 nm. It may be noted than the "expandable graphite" is not "expanded graphite" (to be further explained later).

Figure 1B:
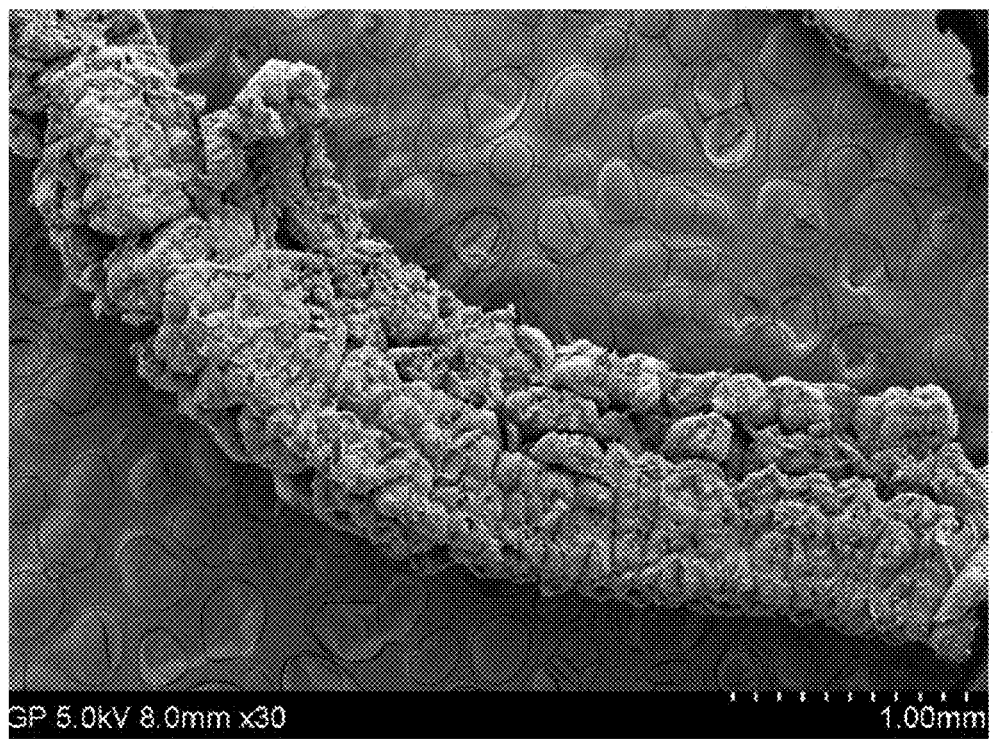
FIG. 1(B) An SEM image of graphite worms.
Figure 1C:
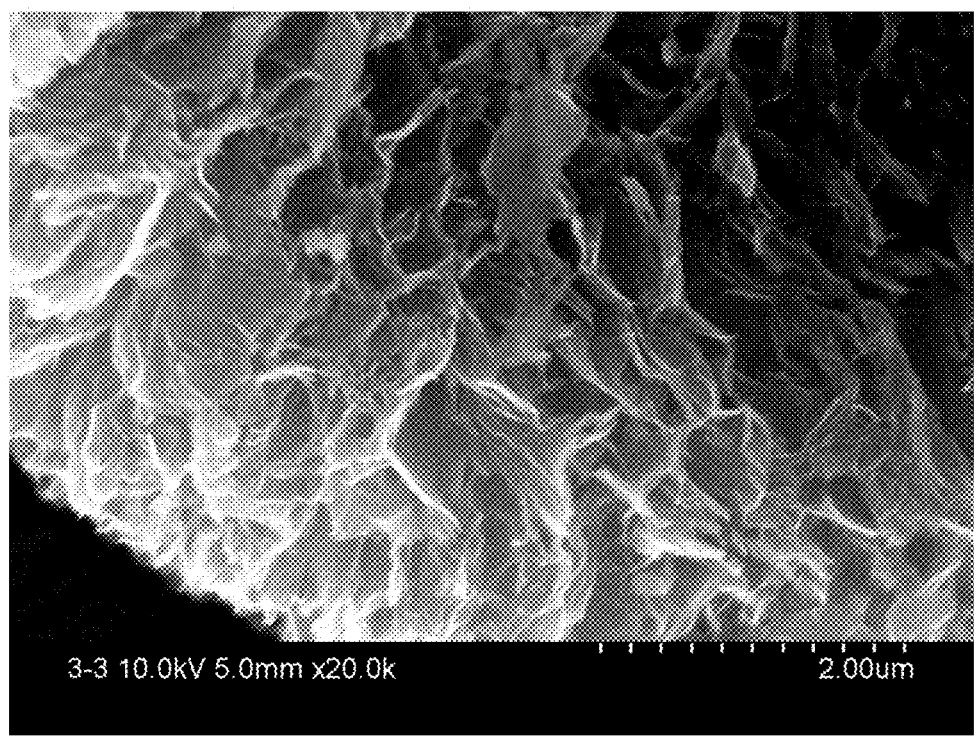
FIG. 1(C) Another SEM image of graphite worms.
Figure 1D:
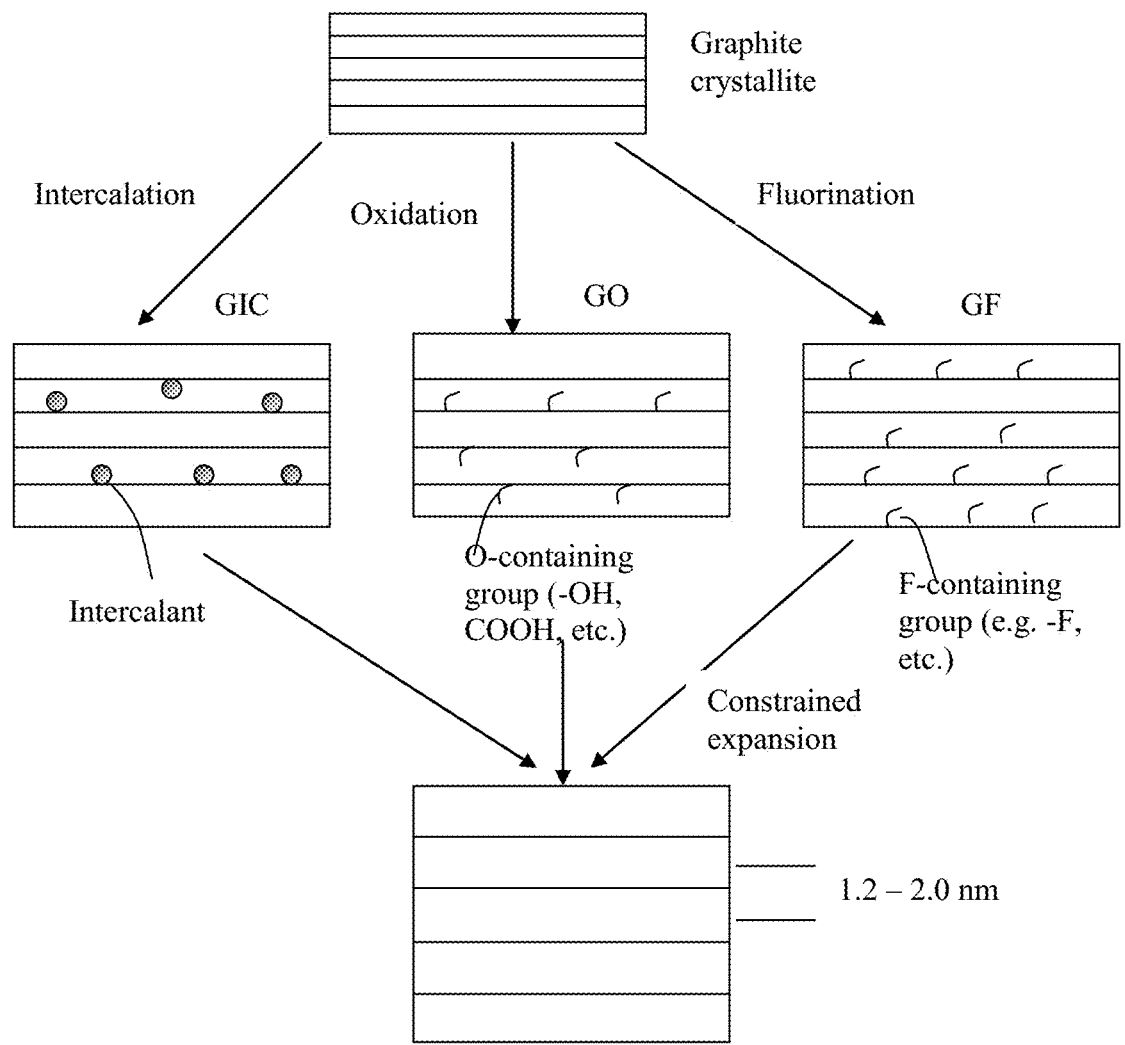
FIG. 1(D) Schematic drawing illustrating the approaches of producing graphite structures containing expanded inter-planar spaces.

Upon exposure of expandable graphite to a temperature in the range of typically 800-1,050° C. for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIG. 1(B) and FIG. 1(C)). In exfoliated graphite, individual graphite flakes (each containing 1 to several hundred of graphene planes stacked together) are highly spaced from one another, having a spacing of typically 2.0 nm-200 μm. However, they remain physically interconnected, forming an accordion or worm-like structure.

In graphite industry, graphite worms can be re-compressed to obtain flexible graphite sheets or foils (106) that typically have a thickness in the range of 0.1 mm (100 μm)-0.5 mm (500 μm). In the instant invention, a cathode active material or its precursor is incorporated into pores of a mass of graphite worms before this mass is re-compressed to form a cathode layer of a desired porosity level or physical density.

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. These expanded graphite flakes do not have expanded $d_{002}$ spacing. Their $d_{002}$ spacing remains to be in the range of 0.335-0.36 nm.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our US Application No. 20050271574, dated Dec. 8, 2005. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation has been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g. at 800-1,050° C.) and allowed to freely expand, the final product is exfoliated graphite worms. However, if the mass of GIC or graphite oxide is subjected to a constrained condition (e.g. being confined in an autoclave under a constant volume condition or under a uniaxial compression in a mold) while being heated at a temperature from 150° C. to 800° C. (more typically from 300° C. to 600°), the extent of expansion can be constrained and the product can have inter-planar spaces from 1.0 nm to 3.0 nm, or from 1.2 nm to 2.0 nm.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

In addition to N, O, F, Br, Cl, or H, the presence of other chemical species (e.g. Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing.

In addition to natural graphite and artificial graphite, there is a broad array of carbonaceous materials, such as a soft carbon, hard carbon, meso-phase carbon, coke, carbonized pitch, carbon black, activated carbon, carbon aerogel, carbon xerogel, and partially graphitized carbon (commonly referred to as the disordered carbon materials) which can be subjected to similar expansion treatments to obtain a carbon material having expanded spaces. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable. Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

C. Impregnation of Sulfur or Metal Polysulfide into Expanded Inter-Planar Spaces of Carbon/Graphite Once a layer of graphite/carbon material having expanded d spacing (e.g. in the form of a porous sheet, paper, web, film, fabric, non-woven, mat, aggregate, or foam) is prepared, this layer can be immersed in an electrolyte (preferably liquid electrolyte), which comprises a solvent and a sulfur source dissolved or dispersed in the solvent. This layer basically serves as a cathode in an external electrochemical deposition chamber or a cathode in an intended alkali metal-sulfur cell (encased inside the packaging or casing of a battery).

Subsequently, an anode layer is also immersed in the chamber, or encased inside a battery cell. Any conductive material can be used as an anode material, but preferably this layer contains some lithium (or sodium or potassium). In such an arrangement, the carbon/graphite structure (the electrochemical cathode) and the anode are in ionic contact with the electrolyte. An electric current is then supplied between the anode and the cathode with a sufficient current density for a sufficient period of time to electrochemically impregnate sulfur in the expanded interstitial spaces to form the pre-sulfurized active cathode layer. The required current density depends upon the desired speed of deposition and uniformity of the deposited material.

This current density can be readily adjusted to impregnate a controlled amount of S particles or coating in the expanded spaces between two hexagonal carbon planes (between graphene planes). The resulting nano-scaled sulfur particles or coating occupy a weight fraction of at least 70% (preferably >80%, more preferably >90%, and most preferably >95%) based on the total weights of the sulfur particles or coating and the graphite/carbon material combined.

In one preferred embodiment, the sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—S cell.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

For the purpose of internal electrochemical impregnation of S into expanded interstitial spaces of a cathode layer in a cell, the electrolyte may further comprise an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$), or a combination thereof.

In one preferred embodiment, as previously stated above, the electrochemical impregnation is conducted before the cathode active layer is incorporated into an intended alkali metal-sulfur (e.g. Li—S) battery cell. In other words, the anode, the electrolyte, and the graphite/carbon material layer having expanded interstitial spaces (serving as a cathode layer) are positioned in an external container outside of the intended battery cell. The needed apparatus is similar to an electro-plating system. The step of electrochemically impregnating sulfur is conducted outside the battery cell and prior to the battery cell fabrication.

In another embodiment, the anode, the electrolyte, and the graphite/carbon material layer are disposed inside an alkali metal-sulfur cell. In other words, the battery cell itself is an electrochemical deposition system for pre-sulfurization of the cathode and the step of electrochemically impregnating sulfur particles or coating occurs after the battery cell is fabricated. This electrochemical deposition procedure is conducted during the first charge cycle of the Li—S cell, Na—S cell, or K—S cell.

After an extensive and in-depth research effort, we have come to realize that such a pre-sulfurization of expanded interstitial spaces between graphene planes surprisingly solves several most critical issues associated with current Li—S, Na—S, and K—S cells. For instance, this method enables the sulfur to be deposited in a thin coating or ultra-fine particle form, thus, providing ultra-short diffusion paths for Li/Na/K ions and, hence, ultra-fast reaction times for fast battery charges and discharges. This is achieved while maintaining a relatively high proportion of sulfur (the active material responsible for storing Li, Na, or K) and, thus, high specific Li/Na/K storage capacity of the resulting cathode active layer in terms of high specific capacity (mAh/g, based on the total weight of the cathode layer, including the masses of the active material, S, supporting graphite/carbon material, optional binder resin, and optional conductive filler).

It is of significance to note that one might be able to use a prior art procedure to deposit small S particles, but not a high S proportion, or to achieve a high proportion but only in large particles or thick film form. But, the prior art procedures have not been able to achieve both at the same time. It is highly advantageous to obtain a high sulfur loading and yet, concurrently, maintaining an ultra-thin/small thickness/diameter of sulfur for significantly enhanced energy density and power density. This has not been possible with any prior art sulfur loading techniques. For instance, we have been able to deposit nano-scaled sulfur that occupies a >90% weight fraction of the cathode layer and yet maintaining a coating thickness or particle diameter <2 nm. This is quite a feat in the art of lithium-sulfur batteries.

Electrochemists or materials scientists in the art of Li—S batteries would expect that a greater amount of highly conducting carbon or graphite materials (hence, a smaller amount of S) in the cathode active layer should lead to a better utilization of S, particularly under high charge/discharge rate conditions. Contrary to these expectations, we have observed that the key to achieving a high S utilization efficiency is minimizing the S coating or particle size and is independent of the amount of S loaded into the cathode provided the S coating or particle thickness/diameter is small enough (e.g. <2 nm, as confined in the expanded interstitial spaces between graphene planes). The problem here is that it has not been previously possible to maintain a thin S coating or small particle size if S is higher than 50% by weight. Here we have further surprisingly observed that the key to enabling a high specific capacity at the cathode under high charge/discharge rate conditions is to maintain a high S loading and still keep the S coating or particle size as small as possible, and this is accomplished by using the presently invented expanded d-spacing method.

The electrons coming from or going out through the external load or circuit must go through the conductive additives (in a conventional sulfur cathode) or a conductive framework (e.g. conductive graphite/carbon backbone structure as herein disclosed) to reach the cathode active material. Since the cathode active material (e.g. sulfur or lithium polysulfide) is a poor electronic conductor, the active material particle or coating must be as thin as possible to reduce the required electron travel distance. The limited spaces (up to only 2 nm) meet this requirement.

Furthermore, the cathode in a conventional Li—S cell typically has less than 70% by weight of sulfur in a composite cathode composed of sulfur and the conductive additive/support. Even when the sulfur content in the prior art composite cathode reaches or exceeds 70% by weight, the specific capacity of the composite cathode is typically significantly lower than what is expected based on theoretical predictions. For instance, the theoretical specific capacity of sulfur is 1,675 mAh/g. A composite cathode composed of 70% sulfur (S) and 30% carbon black (CB), without any binder, should be capable of storing up to 1,675×70%=1,172 mAh/g. Unfortunately, the observed specific capacity is typically less than 75% or 879 mAh/g (often less than 50% or 586 mAh/g in this example) of what could be achieved. In other words, the active material (S) utilization rate is typically less than 75% (or even <50%). This has been a major issue in the art of Li—S cells and there has been no solution to this problem. Most surprisingly, the implementation of a conductive carbon/graphite material having expanded inter-planar spaces for accepting sulfur or lithium polysulfide has made it possible to achieve an active material utilization rate of typically >>80%, more often greater than 90%, and, in many cases, close to 99%.

Still another unexpected result of the instant method is the observation that instant strategy leads to more stable charge/discharge cycling with significantly reduced shuttling effect that has been a long-standing impediment to full commercialization of Li—S batteries. We overcome this problem yet, at the same time, achieving a high specific capacity. In all prior art Li—S cells, a higher S loading leads to a faster capacity decay.

The shuttling effect is related to the tendency for sulfur or alkali metal polysulfide that forms at the cathode to get dissolved in the solvent and for the dissolved lithium polysulfide species to migrate from the cathode to the anode, where they irreversibly react with lithium to form species that prevent sulfide from returning back to the cathode during the subsequent discharge operation of the Li—S cell (the detrimental shuttling effect). It appears that the expanded interstitial spaces between graphene planes have effectively trapped sulfur and metal polysulfide therein, thereby preventing or reducing such a dissolution and migration issue.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, SCN$^-$, SeCN$^-$, CuCl$_2^-$, AlCl$_4^-$, F(HF)$_{2.3}^-$, etc. Relatively speaking, the combination of imidazolium- or sulfonium-based cations and complex halide anions such as AlCl$_4^-$, BF$_4^-$, CF$_3$CO$_2^-$, CF$_3$SO$_3^-$, NTf$_2^-$, N(SO$_2$F)$_2^-$, or F(HF)$_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In one embodiment, the cathode layer may be pre-loaded with up to 30% (preferably <15% and more preferably <10%) of an active material (sulfur or lithium polysulfide) prior to the cathode layer fabrication. In yet another embodiment, the cathode layer can contain a conductive filler, such as carbon black (CB), acetylene black (AB), graphite particles, activated carbon, meso-porous carbon, meso-carbon micro bead (MCMB), carbon nano-tube (CNT), carbon nano-fiber (CNF), carbon fiber, or a combination thereof. These materials (not having expanded d spacing) are for use as a conductive filler, not as a support for S.

The anode active material may contain, as an example, lithium metal foil or a high-capacity Si, Sn, or SnO$_2$ capable of storing a great amount of lithium. The cathode active material may contain pure sulfur (if the anode active material contains lithium), lithium polysulfide, or any sulfur containing compound, molecule, or polymer. If the cathode active material includes lithium-containing species (e.g. lithium polysulfide) when the cell is made, the anode active material can be any material capable of storing a large amount of lithium (e.g. Si, Ge, Sn, SnO$_2$, etc.).

At the anode side, when lithium metal is used as the sole anode active material in a Li—S cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nano-structure composed of conductive nano-filaments. For the latter, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-sulfur with a conventional anode configuration: The cell contains an optional cathode current collector, a presently invented cathode layer, a separator/electrolyte, and an anode current collector. Potential dendrite formation may be overcome by using the high-concentration electrolyte at the anode.

(B) Lithium metal-sulfur cell with a nano-structured anode configuration: The cell contains an optional cathode current collector, a cathode herein invented, a separator/electrolyte, an optional anode current collector, and a nano-structure to accommodate lithium metal that is deposited back to the anode during a charge or re-charge operation. This nano-structure (web, mat, or paper) of nano-filaments provide a uniform electric field enabling uniform Li metal deposition, reducing the propensity to form dendrites. This configuration can provide a dendrite-free cell for a long and safe cycling behavior.

(C) Lithium ion-sulfur cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-sulfur cell with a nano-structured anode: For instance, the cell contains a web of nano-fibers coated with Si coating or bonded with Si nano particles. The cell also contains an optional cathode current collector, a cathode herein invented, a separator/electrolyte, and an anode current collector. This configuration provides an ultra-high capacity, high energy density, and a safe and long cycle life.

In the lithium-ion sulfur cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector. This cathode current collector is optional because the presently invented layer of porous graphite/graphene structure, if properly designed, can act as a current collector or as an extension of a current collector.

For a sodium ion-sulfur cell or potassium ion-sulfur cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Oxidation of Graphite to Produce Graphite Particles Having Expanded d Spacing Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

X-ray diffraction studies showed that after a treatment of 24 hours, a significant proportion of graphite has been transformed into graphite oxide. The peak at $2\theta=26.3$ degrees, corresponding to an inter-planar spacing of 0.335 nm (3.35 Å) for pristine natural graphite was significantly reduced in intensity after a deep oxidation treatment for 24 hours and a peak typically near $2\theta=9$-14 degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at $2\theta=11.75$-13.7 degrees appeared).

Example 2: Oxidation and Intercalation of Various Graphitic Carbon and Graphite Materials Samples 2A, 2B, 2C, and 2D were prepared according to the same procedure used for Sample 1B, but the starting graphite materials were pieces of highly oriented pyrolytic graphite (HOPG), graphite fiber, graphitic carbon nano-fiber, and spheroidal graphite, respectively. Their final inter-planar spacings are 6.6 Å, 7.3 Å, 7.3 Å, and 6.6 Å, respectively. Their un-treated counterparts are referred to as Sample 2a, 2b, 2c, and 2d, respectively.

Example 3: Preparation of Graphite Oxide from Natural Graphite and Needle Coke Using a Modified Hummers' Method Graphite oxide (Sample 3A) was prepared by oxidation of natural graphite flakes (original size of 200 mesh, from Huadong Graphite Co., Pingdu, China, milled to approximately 15.mu.m, referred to as Sample 3a) and needle coke with sulfuric acid, sodium nitrate, and potassium permanganate according to the method of Hummers [U.S. Pat. No. 2,798,878, Jul. 9, 1957]. Anisotropic needle coke has a fully developed needle-shape texture of optical anisotropy. Volatile species of the raw coke was estimated to be around 5 wt. %.

In this example, for every 1 gram of graphite or needle coke, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35.degree. C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Example 4: Oxidation of Meso-Carbon Micro-Beads (MCMBs) and Hard Carbon Particles Graphite oxide (Sample 4A) was prepared by oxidation of meso-carbon micro-beads (MCMBs) according to the same procedure used in Example 3. MCMB microbeads (Sample 4a) were supplied by China Steel Chemical Co. Taiwan. This material has a density of about 2.24 g/cm$^3$; a particle size maximum for at least 95% by weight of the particles of 37 microns; median size of about 22.5 microns and an inter-planar distance of about 0.336 nm. After deep oxidation treatment, the inter-planar spacing in the resulting graphite oxide micro-beads is approximately 0.76 nm.

A pitch sample (A-500 from Ashland Chemical Co.) was carbonized in a tube furnace at 900° C. for 2 hours, followed by further carbonization at 1,200° C. for 4 hours to produce hard carbon particles. The hard carbon particles were subjected to the same oxidation treatment of MCMBs. The expanded spaces of the oxidized hard carbon particles are approximately 0.83 nm.

Example 5: Bromination and Fluorination of Carbon Fibers

Graphitized carbon fiber (Sample 5a), having an inter-planar spacing of 3.37 Å (0.337 nm) and a fiber diameter of 10 μm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only.

Example 6: Fluorination of Carbon Fibers

A $CF_{0.68}$ sample obtained in EXAMPLE 5 was exposed at 250° C. and 1 atmosphere to vapors of 1,4-dibromo-2-butene ($BrH_2C$—$CH$=$CH$—$CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide. The d spacing was from 0.65 nm to 1.22 nm.

Example 7: Fluorination of Graphite to Increase Inter-Planar Spacing

Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.75})_n$. X-ray diffraction indicated a major (002) peak at $2\theta=13.5$ degrees, corresponding to an inter-planar spacing of 6.25 Å.

Sample 7B was obtained in a manner similar to that for Sample 7A, but at a reaction temperature of 640° C. for 5 hours. The chemical composition was determined to be $(CF_{0.93})_n$. X-ray diffraction indicated a major (002) peak at $2\theta=9.5$ degrees, corresponding to an inter-planar spacing of 9.2 Å.

Example 8: Preparation of Carbon-Coated GO Particles Subjected to Constrained Expansion Two polymeric carbon-coated GO samples (Samples 8-A and 8-B) were prepared by mixing GO particles (prepared in Example 3 and Example 4, respectively) with a phenol resin to obtain a mixture comprising 20% by volume of phenol resin in each case. The mixture was cured at 200° C. for one hour and then carbonized in an argon atmosphere at a temperature of 500° C. under a constant-volume condition. Then, the carbonized product was ground and milled to obtain particles of 1 to 23 μm, with an average diameter of approximately 13 μm. The inter-planar spacing was determined to be approximately 0.73 nm and 0.76 nm, respectively, prior to the constrained expansion treatment. After this constrained expansion treatment, the d spacing of the GO particles was increased to 1.27 nm and 1.48 nm, respectively (Samples 8-C and 8-D).

Example 9: Preparation of Carbon-Coated GF Particles

Natural flake graphite, milled to an average size of approximately 14 microns, was subjected to the same fluorination treatment as described in Example 7 and determined to be $(CF_{0.75})_n$ (Sample 7B). The resulting powder was subjected to a chemical vapor deposition (CVD) of amorphous carbon according to a procedure suggested by Tanaka, et al., U.S. Pat. No. 5,344,726. A $(CF_{0.75})_n$ sample powder of 50 mg was placed in a quartz tube reactor, and then argon gas and propane gas were supplied from an argon supply line and a propane supply line, respectively. Then, a propane concentration of raw gas was set to 10 mole % by handling needle valves. Flow velocity of the raw gas was set to 12.7 cm/min and an amount of supply of propane was set to 0.05 mol/h. It may be noted that a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. The powder was heated by a furnace at approximately 750° C. under a constant-volume condition, whereby propane supplied from a pyrex tube was pyrolytically decomposed with a pyrolysis carbon being deposited on the surface of the graphite fluoride powder. The resulting material was milled to become fine particles of approximately 16.5 microns, which are essentially amorphous carbon-coated GF particles (Sample 9B).

Example 10: Preparation of Graphene Foam Having Pore Walls with Expanded Inter-Planar Spaces In one sample, five grams of the graphite oxide were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a glass surface using a doctor's blade to exert shear stresses, inducing GO sheet orientations. The resulting GO coating films, after removal of liquid, have a thickness that can be varied from approximately 5 to 500 μm (preferably and typically from 10 μm to 50 μm).

For making a graphene foam specimen, the GO coating film was then subjected to heat treatments that typically involve an initial thermal reduction temperature of 80-350° C. for 1-8 hours, followed by heat-treating at a second temperature of 1,500-2,850° C. for 0.5 to 5 hours.

Several pieces of GO-derived graphene foam were subsequently subjected to oxidation treatment to produce GO foam containing graphene pore walls having expanded inter-planar spaces.

Example 11: Preparation of Graphite Foam Having Pore Walls with Expanded Inter-Planar Spaces Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Several pieces of graphite foam were subjected to fluorination to obtain graphite fluoride foam according to the procedure used in Example 7.

Example 12: Electrochemical Impregnation of S in Various Cathode Structures Prepared in Previous Examples (External Electrochemical Deposition) for Li—S, Na—S, and K—S Batteries The electrochemical deposition may be conducted before the cathode active layer is incorporated into an alkali metal-sulfur battery cell (Li—S, Na—S, or K—S cell). In this approach, the anode, the electrolyte, and a layer of graphite/carbon having expanded d spacing or a graphene foam (serving as a cathode layer) are positioned in an external container outside of a lithium-sulfur cell. The needed apparatus is similar to an electro-plating system, which is well-known in the art.

In a typical procedure, a metal polysulfide ($M_xS_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polysulfide in this desired solvent. A greater solubility would mean a larger amount of sulfur can be derived from the electrolyte solution.

The electrolyte solution is then poured into a chamber or reactor under a dry and controlled atmosphere condition (e.g. He or Nitrogen gas). A metal foil can be used as the anode and a layer of the porous graphene structure (with or without expanded inter-planar spacing in the pore walls) as the cathode; both being immersed in the electrolyte solution. The electrochemical cathode layer may be selected from a layer of graphite/carbon particles (having expanded d spacing) bonded by a binder resin. This configuration constitutes an electrochemical impregnation and deposition system. The step of electrochemically impregnating sulfur into expanded inter-planar spaces is conducted at a current density preferably in the range of 1 mA/g to 10 A/g, based on the layer weight of the porous graphene structure.

The chemical reactions that occur in this reactor may be represented by the following equation: $M_xS_y \rightarrow M_xS_{y-z}+zS$ (typically z=1-4). Quite surprisingly, the resulting S readily penetrates the expanded spaces and, in the case of graphene foam or graphite foam, sulfur can get preferentially nucleated and grown on massive graphene surfaces to form nano-scaled coating or nano particles. The coating thickness or particle diameter and the amount of S coating/particles may be controlled by the specific surface area, electrochemical reaction current density, temperature and time. In general, a lower current density and lower reaction temperature lead to a more uniform intercalation of S and the reactions are easier to control. A longer reaction time leads to a larger amount of S saturated in the expanded inter-planar spaces and, in the case of graphene foam, also deposited on graphene surfaces and the reaction is ceased when the sulfur source is consumed or when a desired amount of S is deposited.

Impregnation of S into the expanded interstitial spaces was also conducted using liquid solution impregnation, chemical intercalation, and vapor phase intercalation. For instance, sulfur can be sublimed at a temperature higher than 116° C. to create sulfur vapor in a low-pressure chamber in which the intended cathode layer is also positioned to receive the S vapor. It is quite surprising to observe that S vapor readily permeates into expanded spaces in a graphite or carbon material. However, liquid solution impregnation, chemical intercalation, and vapor phase intercalation were found to impregnate only up to 45%, 48%, and 64% by weight, respectively, of S into expanded inter-planar spaces of a carbon/graphite material. In contrast, the electrochemical impregnation method can readily impregnate from 1% to 99% by weight of S (typically >65% by weight, more typically >75%, further more typically >85%, and even >95%). Additionally, the electrochemical method is capable of rapidly converting the impregnated S into metal polysulfide (lithium polysulfide, sodium polysulfide, and potassium polysulfide, etc.).

Example 13: Chemical Reaction-Induced Impregnation of Sulfur

A chemical impregnation method is herein utilized to prepare S-impregnated carbon fibers having expanded inter-planar spacing prepared in Example 6. The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a sulfur-impregnated carbon fiber sample was prepared by a chemical impregnation method in an aqueous solution. First, 180 mg of expansion-treated carbon fibers was suspended in 180 ml ultrapure water with a surfactant and then sonicated at 50° C. for 5 hours to form a stable carbon fiber dispersion. Subsequently, the $Na_2S_x$ solution was added to the above-prepared dispersions in the presence of 5 wt % surfactant cetyl trimethyl-ammonium bromide (CTAB), the as-prepared carbon fiber/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-}+2H^+\rightarrow(x-1)S+H_2S$.

Example 14: Redox Chemical Reaction-Induced Impregnation of Sulfur in Oxidized MCMBs and Oxidized Needle Coke In this chemical reaction-based deposition process, sodium thiosulfate ($Na_2S_2O_3$) was used as a sulfur source and HCl as a reactant. An oxidized MCMB-water or oxidized needle coke-water suspension was prepared and then the two reactants (HCl and $Na_2S_2O_3$) were poured into this suspension. The reaction was allowed to proceed at 25-75° C. for 1-3 hours, leading to impregnation of S into expanded spaces and the precipitation of some S particles on particle surfaces. The reaction may be represented by the following reaction:

$$2HCl+Na_2S_2O_3\rightarrow 2NaCl+S\downarrow+SO_2\uparrow+H_2O.$$

Example 15: Electrochemical Impregnation of S in Various Cathode Structures in Li—S, Na—S, or K—S Batteries (Internal Electrochemical Deposition)

As an alternative to the external electrochemical deposition, an internal electrochemical conversion and deposition of S from an electrolyte-borne sulfur source in expanded spaces was also conducted using a broad array of graphite/carbon material structures. As a typical procedure, the anode, the electrolyte, and the expansion-treated structure are packaged inside a housing to form an alkali metal-sulfur cell. In such a configuration, the battery cell itself is an electrochemical impregnation system for sulfurization of the cathode and the step of electrochemically impregnating or intercalating sulfur occurs after the battery cell is fabricated and conducted during the first charge cycle of the cell.

As a series of examples, lithium polysulfide ($Li_xS_y$)- and sodium polysulfide ($Na_xS_y$)-containing electrolytes with desired x and y values (e.g. x=2, and y=6-10) dissolved in solvent were prepared by chemically reacting stoichiometric amounts of sulfur and $Li_2S$ or $Na_2S$ in polysulfide free electrolyte of 0.5 M LiTFSI+0.2 M $LiNO_3$ (or 0.5 M NaTFSI+0.2 M $NaNO_3$) in DOL/DME (1:1, v:v). The electrolyte was stirred at 75° C. for 3-7 hours and then at room temperature for 48 hours. The resulting electrolytes contain different $Li_xS_y$ or $Na_xS_y$ species (e.g. x=2, and y=6-10, depending upon reaction times and temperatures), which are intended for use as a sulfur source in a battery cell.

In a Li—S or Na—S cell, one of these electrolytes was selected to combine with an anode current collector (Cu foil), an anode layer (e.g. Li metal foil or Na particles), a porous separator, a layer of expansion-treated graphite structure, and a cathode current collector (Al foil) to form a Li—S or room temperature Na—S cell. The cell was then subjected to a first charge procedure using a current density ranging from 5 mA/g to 50 A/g. The best current density range was found to be from 50 mA/g to 5 A/g.

Examples of the metal polysulfide ($M_xS_y$) materials, solvents, expansion-treated graphite/carbon materials used in the present study are presented in Table 1 below, wherein the following abbreviations are used: natural graphite (NG), soft carbon particles (SC), hard carbon (HC), activated carbon (AC), multi-walled carbon nanotube (CNT), carbon fiber (CF), carbonized polymer fiber (PF), needle coke (coke), meso-phase carbon (MC), vapor-grown carbon or graphite nano fiber (VG-CNF or VG-GNF), metal nano wire (MNW), conductive polymer-coated nano-fiber (CP-NF).

TABLE 1

Selected examples of the metal polysulfide materials, solvents, graphite/carbon materials used in the present study.

| Sulfur source (e.g. $M_xS_y$) | Solvent | Li/Na/K salts | Type of graphite/carbon structure in the cathode |
|---|---|---|---|
| $Li_2S_6$ | DOL/DME | LiTFSI | SC, HC, AC, NG, MCMB |
| $Li_2S_9$ | DOL/DME | LiTFSI | SC, HC, CF, graphite foam |
| $Na_2S_5$ | Tetra ethylene glycol dimethyl ether (TEGDME) | NaTFSI | CNT, coke, PF, graphite foam, graphene foam |
| $Na_2S_6$ | TEGDME | NaTFSI | CNT, CF, GNF |
| $K_2S_6$ | TEGDME | KTFSI | coke, MC, CP-NW, VG-CNF, VG-GNF |
| $MgS_6$ | Diglyme/tetraglyme | $[Mg_2Cl_3][HMDSAlCl_3]$ (HMDS = hexamethyldisilazide) | NG, MCMB, CP-NF |
| $MgS_4$ | Diglyme/tetraglyme | $[Mg_2Cl_3][HMDSAlCl_3]$ (HMDS = hexamethyldisilazide) | SC, HC, AC, MNW |
| $CuS_2$ | $NH_4OH$, HCl or $H_2SO_4$ | $CuCl_2$ | CNT, NG, MCMB |
| $Cu_8S_5$ | $NH_4OH$, HCl or $H_2SO_4$ | $CuCl_2$ | SC, HC, graphite foam |
| ZnS | $H_2SO_4$ solution | $ZnSO_4$ | SC, HC, NG |
| $Al_2S_3$ | $H_2SO_4$ | $Al_2(SO_4)_3$ | CNT, CF |
| $SnS_2$ | $HNO_3$ and HCl | $SnCl_2$ | coke, MC, GNF |
| SnS | HCl | $SnCl_2$ | coke, CNF, |

There are several prior art methods that could be used to incorporate sulfur or metal polysulfide (the cathode active material) in the cathode layer; e.g. direct mixing of S or metal polysulfide powder with carbon black particles, physical vapor deposition of S in a carbon paper (e.g. carbon nano-fiber, CNF), direct mixing lithium polysulfide particles with a conductive filler (e.g. carbon nanotubes), etc. For comparison purposes, we have chosen 3 methods:

Examples 16: Simple Liquid Solution Dipping

One way to incorporate sulfur or lithium polysulfide particles in a pre-fabricated web of conductive CNF sheets is to use a dip-coating process. In a typical procedure, a CNF-based web was immersed (dipped) in a suspension containing lithium polysulfide particles dispersed in a fluid; e.g. a low molecular weight polyethylene oxide (PEO) that could later become part of a polymer gel phase. This PEO had a melting point lower than 60° C., which gave a relatively low-viscosity fluid at 90° C. The lithium polysulfide particle concentrations (typically 5% to 40% by volume) and the immersion time (typically 1-10 seconds) were adjusted to achieve a desired amount of lithium polysulfide particles embedded in the pores between individual CNFs. However, lithium polysulfide does not penetrate into inter-planar spaces in the CNFs having expanded spaces.

Examples 17: Preparation of Sulfur-Impregnated Webs for Cathodes

The step involves impregnation of elemental sulfur in carbon/graphite structures through, for instance, a sublimation-based physical vapor deposition. Sublimation of solid sulfur occurs at a temperature greater than 40° C., but a significant and practically useful sublimation rate typically does not occur until the temperature is above 100° C. (we typically used 117-160° C.). In a typical procedure, a carbon/graphite structure or nano-filament web, having expanded inter-planar spaces) is sealed in a glass tube with the solid sulfur positioned at one end of the tube and the web near another end. The sulfur vapor exposure time was typically from several minutes to several hours.

Comparative Examples 18C: Mixing of Sulfur with Carbon/Graphite Particles Via Ball-Milling Sulfur particles and soft carbon or natural graphite particles (0% to 49% by weight of S in the resulting composite) were physically blended and then subjected to ball milling for 2-24 hours to obtain S—SC composite particles (typically in a ball or potato shape). The particles, containing various S contents, were then made into a layer of cathode.

Example 19: Some Examples of Electrolytes Used

A wide range of lithium salts can be dissolved in a wide array of solvents, individually or in a mixture form. The following are good choices for lithium salts that are dissolved well to a high concentration in selected solvents: lithium borofluoride ($LiBF_4$), lithium trifluoro-metasulfonate ($LiCF_3SO_3$), lithium bis-trifluoromethyl sulfonylimide ($LiN(CF_3SO_2)_2$ or LITFSI), lithium bis(oxalato)borate (LiBOB), lithium oxalyldifluoroborate ($LiBF_2C_2O_4$), and lithium bisperfluoroethy-sulfonylimide (LiBETI). These selected solvents are DME/DOL mixture, TEGDME/DOL, PEGDME/DOL, and TEGDME. A good electrolyte additive for helping to stabilize Li metal is $LiNO_3$. Useful sodium salts and potassium salts include sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Good solvents are DME/DOL mixture, TEGDME/DOL, PEGDME/DOL, and TEGDME.

Room temperature ionic liquids (RTILs) are of great interest due to their low volatility and non-flammability. Particularly useful ionic liquid-based electrolyte systems include: lithium bis(trifluoro methanesulfonyl)imide in a N-n-butyl-N-ethylpyrrolidinium bis(trifluoromethane sulfonyl)imide (LiTFSI in BEPyTFSI), N-methyl-N-propylpiperidinium bis(trifluoromethyl sulfonyl)imide ($PP_{13}TFSI$) containing LiTFSI, N,N-diethyl-N-methyl-N-(2-methoxyethyl) ammonium bis(trifluoromethylsulfonyl)imide (DEMETFSI) containing LiTFSI.

Example 20: Evaluation of Electrochemical Performance of Various Li—S, Na—S, and K—S Cells Several series of Li metal and Li-ion cells were prepared using the presently prepared cathode layers. The first series is a Li metal cell containing a copper foil as an anode current collector and the second series is also a Li metal cell having a nano-structured anode of conductive filaments (based on electro-spun carbon fibers or CNFs). The third series is a Li-ion cell having a nano-structured anode of conductive filaments (based on electro-spun carbon fibers coated with a thin layer of Si using CVD) plus a copper foil current collector. The fourth series is a Li-ion cell having a pre-lithiated graphite-based anode active material as an example of the more conventional anode. We have found that after large numbers of charge/discharge cycles, the cells containing a nano-structured anode were essentially dendrite-free.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Sulfur utilization efficiency data from many samples investigated are summarized in Table 2 below:

TABLE 2

Sulfur utilization efficiency data for alkali metal-sulfur cell cathodes containing various S contents, graphite/carbon materials having expanded inter-planar spaces (e = expansion treatment).

| Sample ID | Cathode active layer material | % of S and d spacing (nm) | Cathode discharge capacity (mAh/g) | Discharge capacity, mAh/g, based on S weight | S utilization efficiency |
|---|---|---|---|---|---|
| NG-1 | NG-e | 91% S; d = 1.22 nm | 1410 | 1549 | 92.5% |
| NG-2 | NG foam-e | 95% S | 1423 | 1498 | 89.4% |
| NG-3 | NG foam | 95% S | 1238 | 1303 | 77.8% |
| NG-4 | NG-e | 75% S; d = 0.52 nm | 1142 | 1523 | 90.9% |

TABLE 2-continued

Sulfur utilization efficiency data for alkali metal-sulfur cell cathodes containing various S contents, graphite/carbon materials having expanded inter-planar spaces (e = expansion treatment).

| Sample ID | Cathode active layer material | % of S and d spacing (nm) | Cathode discharge capacity (mAh/g) | Discharge capacity, mAh/g, based on S weight | S utilization efficiency |
|---|---|---|---|---|---|
| NG-5 | NG | 90% S; ball-milled | 450 | 500 | 29.85% |
| MCMB-1 | MCMB-e | 92% S; d = 1.35 nm | 1450 | 1576 | 94.0% |
| MCMB-2 | MCMB-e | 84% S, d = 0.72 nm | 1310 | 1559 | 93.1% |
| MCMB-3 | MCMB-e | 78% S, d = 0.54 nm | 1202 | 1541 | 92.0% |
| MCMB-4 | MCMB | d = 0.36 nm | Minimal S impregnated | — | — |
| CF-1 | CF-e | 85% S, d = 0.78 nm | 1305 | 1535 | 91.7% |
| CF-2 | CF-e | 78% S; d = 0.58 nm | 1178 | 1510 | 90.2% |
| CF-3 | CF | d = 0.36 nm | Min. S | — | — |
| CNT-1 | CNT-e | 81% S; 0.63 nm | 1205 | 1488 | 88.8% |
| CNT-2 | CNT-e | 88% S; 0.96 nm | 1320 | 1500 | 89.5% |
| CNT-3 | CNT | 75% S, coated on CNT surfaces | 625 | 833 | 49.8% |
| Coke-1 | Coke-e | 98% S; 1.77 nm | 1485 | 1515 | 90.5% |
| Coke-2 | Coke-e | 95% S; 1.28 nm | 1445 | 1521 | 90.8% |
| Coke-3 | Coke-e | 89% S; 0.88 nm | 1358 | 1525 | 91.1% |
| Coke 4 | Coke-e | 83% S; 0.65 nm | 1287 | 1550 | 92.6% |
| Coke-5 | Coke | d = 0.35 nm | Min. S impregnated | — | — |

The following observations can be made from the data of Table 2 and FIG. 2-FIG. 6:

1) All the carbon/graphite materials having expanded inter-planar spaces to accommodate sulfur therein impart a high level of sulfur utilization efficiency. Taking sample NG-1 as an example, a d-spacing of 1.22 nm leads to a high proportion of sulfur (S) in the expanded spaces (91% by weight) and a high cathode specific capacity of 1410 mAh/g (based on the total cathode active layer weight). This implies that, based on the S material weight alone, the specific capacity is 1,549 mAh/g, which is equal to 1,549/1,675=92.5% out of the theoretical capacity of S (1,675 mAh/g). This implies that up to 92.5% of the S residing in the expanded spaces participates in the storage of Li, or that all the S contributes 92.5% of its Li storage capability to the cathode, or some combinations of these two mechanisms. All the presently invented carbon/graphite materials impart a S utilization efficiency in the range of 88%-94%. In contrast, conventional graphene foam only delivers a S utilization efficiency of 77.8% and the natural graphite particles (when mixed with S using ball-milling) exhibit S utilization efficiency <30%.

Figure 2:
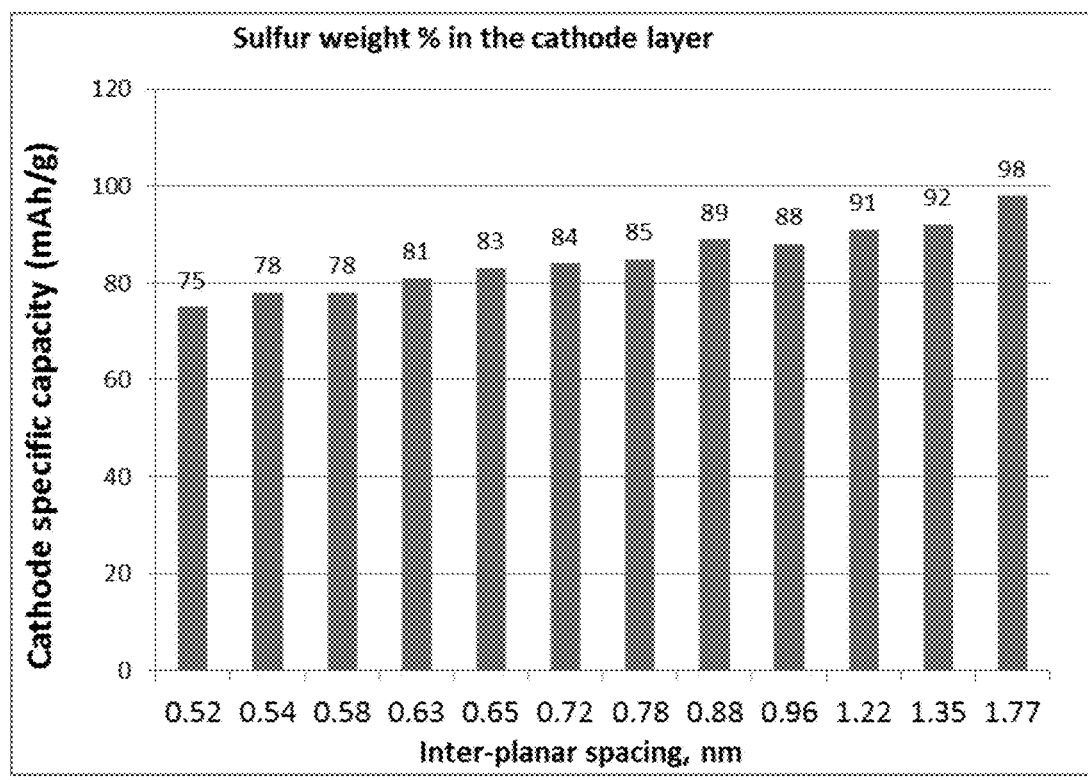
FIG. 2 Sulfur weight proportion in the cathode layer containing carbon/graphite materials having expanded inter-planar spaces to accommodate S, plotted as a function of the inter-laminar spacing $d_{002}$.
Figure 3:
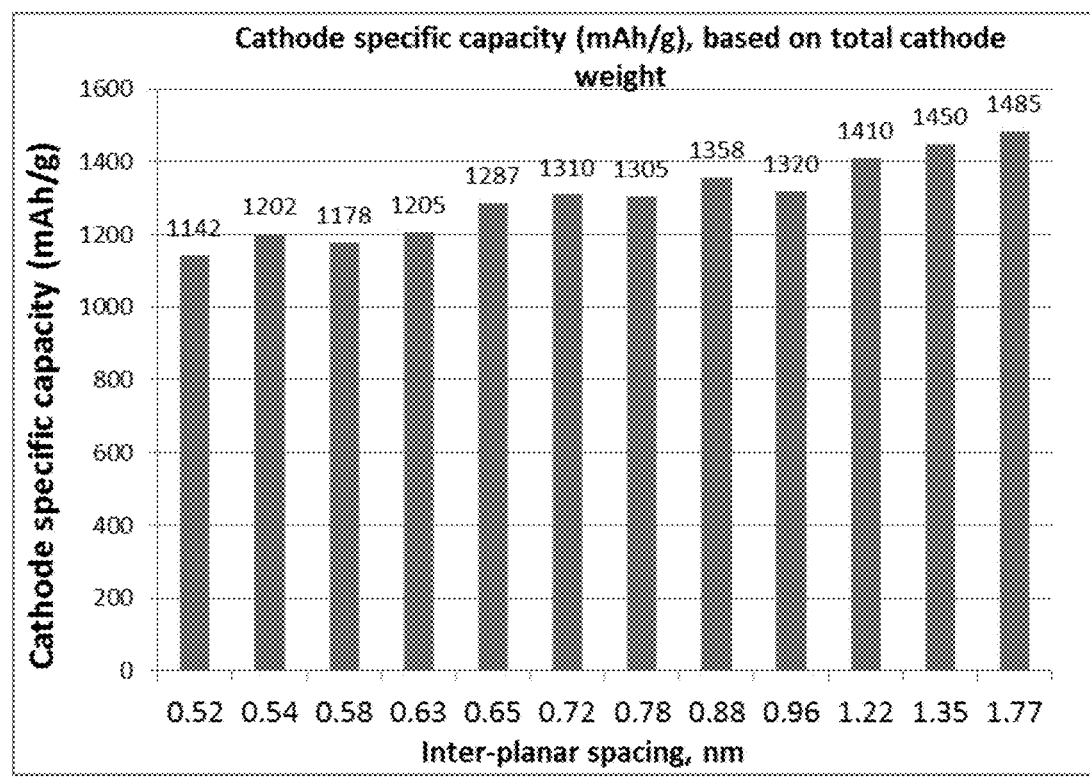
FIG. 3 Cathode specific capacity of a series of Li—S cells featuring a cathode layer containing carbon/graphite materials having expanded inter-planar spaces to accommodate S therein, plotted as a function of the inter-laminar spacing $d_{002}$.

2) To further illustrate the significance of this approach, FIG. 2 shows the sulfur weight proportion in the cathode layer containing carbon/graphite materials having expanded inter-planar spaces to accommodate S, plotted as a function of the inter-laminar spacing $d_{002}$. It is clear that the amount of S stored in the inter-planar spaces scales with the d spacing. FIG. 3 shows the cathode specific capacity of a series of Li—S cells featuring a cathode layer containing carbon/graphite materials having expanded inter-planar spaces to accommodate S therein. Again, the cathode specific capacity is largely proportional to the inter-laminar spacing $d_{002}$.

Figure 4:
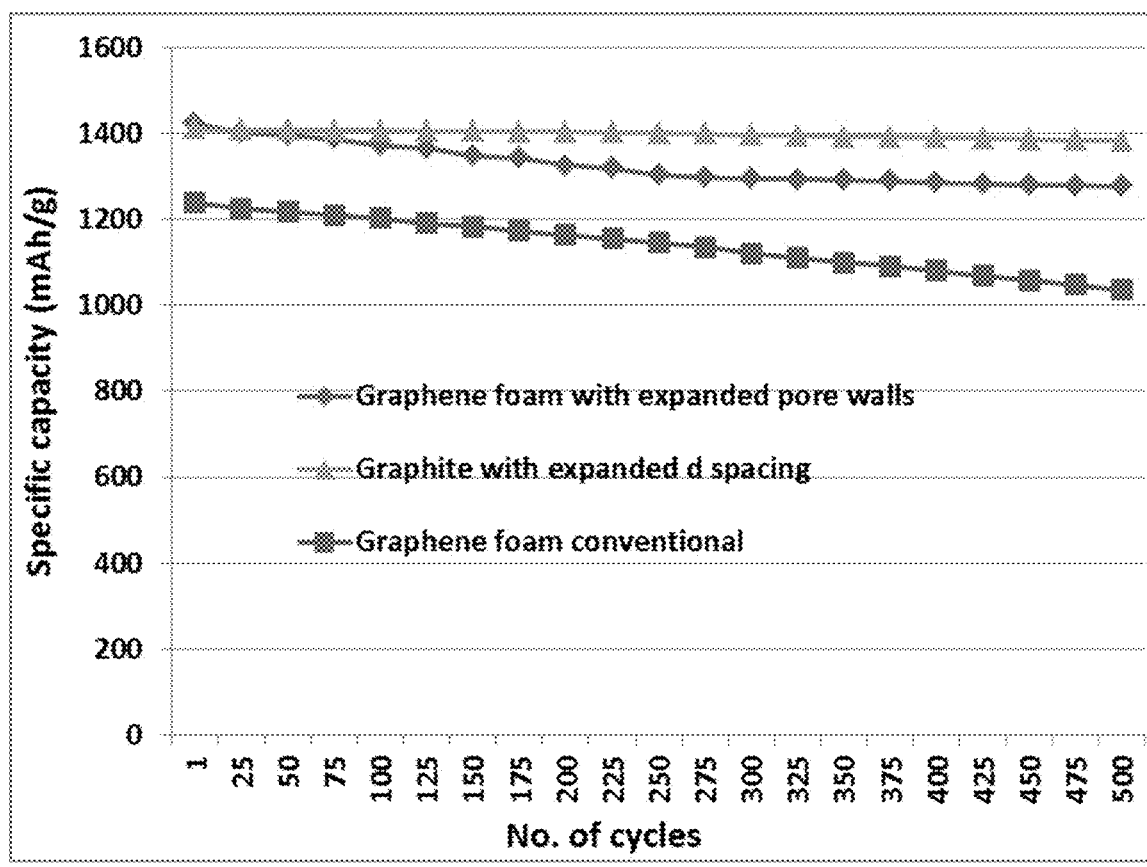
FIG. 4 The specific capacities (vs. number of charge/discharge cycles) for three Li—S cells: one featuring a graphene foam containing pore walls with expanded d spacing (d=1.2 nm); one containing a conventional graphene foam having pore walls made up of closely bonded graphene planes (d=0.34 nm); and one containing graphite particles having expanded inter-laminar spaces, d=1.22 nm. Sulfur was impregnated into inter-planar spaces via the electrochemical procedure.

3) The presently invented approach also enables the Li—S, Na—S, and K—S batteries to deliver high cycling stability. For instance, FIG. 4 shows the specific capacities (vs. number of charge/discharge cycles) for three Li—S cells: one featuring a graphene foam containing pore walls with expanded d spacing (d=1.2 nm); one containing a conventional graphene foam having pore walls made up of closely bonded graphene planes (d=0.34 nm), and one containing graphite particles having expanded inter-laminar spaces, d=1.22 nm. Sulfur was impregnated into inter-planar spaces via the electrochemical procedure.

Figure 5:
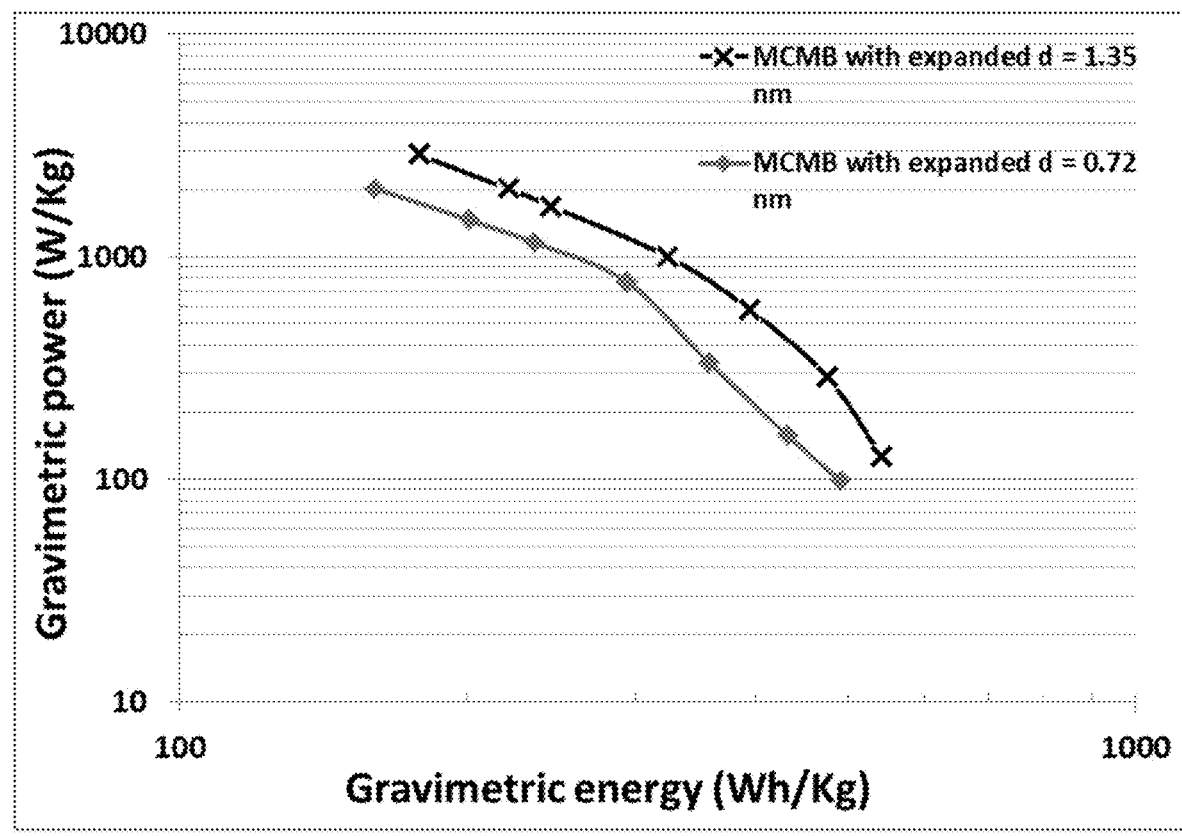
FIG. 5 Ragone plots (cell power density vs. cell energy density) of two Li metal-sulfur cells: one featuring a cathode layer composed of MCMBs with expanded inter-planar spaces (d=1.35 nm) and the other featuring a cathode layer composed of MCMBs with expanded inter-planar spaces (d=0.72 nm).
Figure 6:
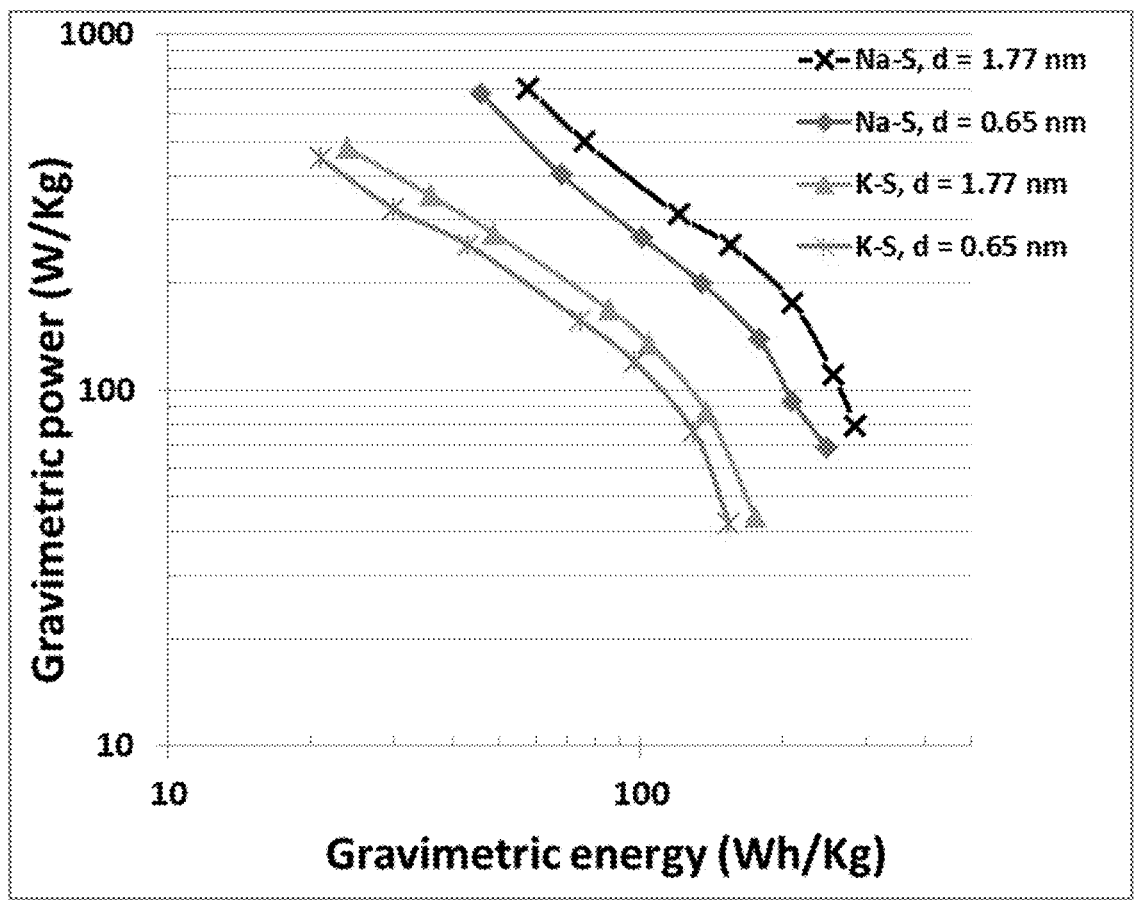
FIG. 6 Ragone plots (cell power density vs. cell energy density) of 4 alkali metal-sulfur cells: Na—S cell featuring a needle coke-based cathode containing electrochemically impregnated sulfur (d=1.77 nm), Na—S cell featuring a needle coke-based cathode containing electrochemically impregnated sulfur (d=0.65 nm), K—S cell featuring a needle coke-based cathode containing electrochemically impregnated sulfur (d=1.77 nm), and K—S cell featuring a needle coke-based cathode containing electrochemically impregnated sulfur (d=0.65 nm).

4) The invented approach also leads to alkali metal-sulfur batteries having exceptional energy densities and power densities. For instance, FIG. 5 shows the Ragone plots (cell power density vs. cell energy density) of two Li metal-sulfur cells: one featuring a cathode layer composed of MCMBs with expanded inter-planar spaces (d=1.35 nm) and the other featuring a cathode layer composed of MCMBs with expanded inter-planar spaces (d=0.72 nm). A cell-level energy density as high as 542 Wh/kg has been achieved with Li—S cells featuring a cathode active material having expanded d spacing. This is 3 times higher than the energy density of the lithium-ion batteries.

Also quite surprisingly, the cell delivers a power density as high as 2879 W/kg, 4-5 times higher than the typical power density of lithium-ion batteries and that of conventional Li—S cells. This power density improvement is very significant in light of the notion that Li—S cells, being conversion-type cells, operate on some chemical reactions during charge/discharge and, hence, typically deliver very low power densities (typically <<500 W/kg). This might be due to the notions that the ultra-thin S inside the expanded spaces implies a potentially short Li ion diffusion pathway and that all S is in good contact with the hexagonal carbon planes that are highly electronically conducting.

5) Similar advantageous features are also observed with Na—S cells and K—S cells. This is evidenced by FIG. 6, which shows the Ragone plots (cell power density vs. cell energy density) of 4 alkali metal-sulfur cells: Na—S cell featuring a needle coke-based cathode containing electrochemically impregnated sulfur particles (d=1.77 nm), Na—S cell featuring a needle coke-based cathode containing electrochemically impregnated sulfur particles (d=0.65 nm), K—S cell featuring a needle coke-based cathode containing electrochemically impregnated sulfur particles (d=1.77 nm), and K—S cell featuring a needle coke-based cathode containing electrochemically impregnated sulfur particles (d=0.65 nm). The invented cells deliver impressive energy densities and power densities.

In summary, the present invention provides an innovative, versatile, and surprisingly effective platform materials technology that enables the design and manufacture of superior alkali metal-sulfur rechargeable batteries. The alkali metal-sulfur cell featuring a cathode layer containing a carbon/graphite material having expanded inter-planar spaces exhibits a high cathode active material utilization rate, high specific capacity, high specific energy, high power density, little or no shuttling effect, and long cycle life. When a nano-structured carbon filament web is implemented at the anode to support a lithium film (e.g. foil), the lithium dendrite issue is also suppressed or eliminated.

The invention claimed is:

1. A rechargeable alkali metal-sulfur cell selected from lithium-sulfur cell, sodium-sulfur cell, or potassium-sulfur cell, said alkali metal-sulfur cell comprising an anode active material layer, an optional anode current collector supporting said anode active material layer, a cathode active material layer, an electrolyte with an optional porous separator layer in ionic contact with said anode active material layer and said cathode active material layer, and an optional cathode current collector supporting said cathode active material layer, wherein said cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in said expanded inter-graphene planar spaces.

2. The rechargeable alkali metal-sulfur cell of claim 1, wherein said metal polysulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

3. The rechargeable alkali metal-sulfur cell of claim 2, wherein said metal element M is selected from Li, Na, K, Mg, Zn, Cu, Ti, Ni, Co, Fe, or Al.

4. The rechargeable alkali metal-sulfur cell of claim 1, wherein said metal polysulfide contains $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

5. The rechargeable alkali metal-sulfur cell of claim 1, wherein said carbon or graphite material in said cathode active material layer is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, carbon arogel, carbon xerogel, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after said expansion treatment.

6. The rechargeable alkali metal-sulfur cell of claim 1, wherein said carbon or graphite material is selected from graphite foam or graphene foam having pores and pore walls, wherein said pore walls contain a stack of bonded graphene planes having an expanded inter-planar spacing $d_{002}$ from 0.45 nm to 1.5 nm.

7. The rechargeable alkali metal-sulfur cell of claim 6, wherein said stack contains from 2 to 100 graphene planes.

8. The rechargeable alkali metal-sulfur cell of claim 1, wherein said inter-planar spacing $d_{002}$ is from 0.5 nm to 1.2 nm.

9. The rechargeable alkali metal-sulfur cell of claim 1, wherein said inter-planar spacing $d_{002}$ is from 1.2 nm to 2.0 nm.

10. The rechargeable alkali metal-sulfur cell of claim 5, wherein said expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material.

11. The rechargeable alkali metal-sulfur cell of claim 10, further comprising a constrained thermal expansion treatment.

12. The rechargeable alkali metal-sulfur cell of claim 1, wherein said carbon or graphite material contains a non-carbon element selected from oxygen, fluorine, chlorine, bromine, iodine, nitrogen, hydrogen, or boron.

13. The rechargeable alkali metal-sulfur cell of claim 1, wherein said cell has a sulfur utilization efficiency greater than 85%.

14. A cathode active material layer for a rechargeable alkali metal-sulfur cell, wherein said cathode active material layer contains a graphite or carbon material having expanded inter-graphene planar spaces with an inter-planar spacing $d_{002}$ from 0.43 nm to 2.0 nm, as measured by X-ray diffraction, and 1%-95% by weight of sulfur or a metal polysulfide residing in said expanded inter-graphene planar spaces.

15. The cathode active material layer of claim 14, wherein said metal polysulfide contains $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, and combinations thereof.

16. The cathode active material layer of claim 15, wherein said metal element M is selected from Li, Na, K, Mg, Zn, Cu, Ti, Ni, Co, Fe, or Al.

17. The cathode active material layer of claim 14, wherein said metal polysulfide contains $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, or $K_2S_{10}$.

18. The cathode active material layer of claim 14, wherein said carbon or graphite material in said cathode active material layer is selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, carbon aerogel, carbon xerogel, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after said expansion treatment.

19. The cathode active material layer of claim 14, wherein said carbon or graphite material is selected from graphene foam or graphene foam having pores and pore walls, wherein said pore walls contain a stack of bonded graphene planes having an expanded inter-planar spacing $d_{002}$ from 0.45 nm to 1.5 nm.

20. The cathode active material layer of claim 19, wherein said stack contains from 2 to 100 graphene planes.

21. The cathode active material layer of claim 14, wherein said inter-planar spacing $d_{002}$ is from 0.5 nm to 1.2 nm.

22. The cathode active material layer of claim 14, wherein said inter-planar spacing $d_{002}$ is from 1.2 nm to 2.0 nm.

23. The cathode active material layer of claim 18, wherein said expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material.

24. The cathode active material layer of claim 23, further comprising a constrained thermal expansion treatment.

25. The cathode active material layer of claim 14, wherein said carbon or graphite material contains a non-carbon element selected from oxygen, fluorine, chlorine, bromine, iodine, nitrogen, hydrogen, or boron.

26. The rechargeable alkali metal-sulfur cell of claim 1, wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

27. The rechargeable alkali metal-sulfur cell of claim 1, wherein said electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$, lithium bis(oxalato)borate (LiBOB), lithium oxalyldifluoroborate ($LiBF_2C_2O_4$), lithium nitrate ($LiNO_3$), Li-fluoroalkyl-phosphates ($LiPF3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

28. The rechargeable alkali metal-sulfur cell of claim 27, wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

29. The rechargeable alkali metal-sulfur cell of claim 1, wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof.

30. The rechargeable alkali metal-sulfur cell of claim 1, wherein said cell is a lithium ion-sulfur cell and said anode active material layer contains an anode active material selected from the group consisting of:
  (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof;
  (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;
  (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;
  (d) salts and hydroxides of Sn and lithiated versions thereof;
  (e) carbon or graphite materials and prelithiated versions thereof; and
  combinations thereof.

31. The rechargeable alkali metal-sulfur cell of claim 1, wherein said cell is a sodium ion-sulfur cell or potassium ion-sulfur cell and said anode active material layer contains an anode active material selected from the group consisting of:
  (a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
  (b) sodium- or potassium-containing alloys or intermetallic compounds of Si, Ge, Sn, Pb, Sb, Bi, Zn, Al, Ti, Co, Ni, Mn, Cd, and their mixtures;
  (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, sd, and mixtures or composites thereof,
  (d) sodium or potassium salts;
  (e) particles of graphite, hard carbon, soft carbon or carbon particles and pre-sodiated versions thereof; and combinations thereof.

32. The rechargeable alkali metal-sulfur cell of claim 1, wherein said cathode active material layer has an active material utilization efficiency no less than 80%.

33. The rechargeable alkali metal-sulfur cell of claim 1, wherein said cathode active material layer has an active material utilization efficiency no less than 90%.

34. The rechargeable alkali metal-sulfur cell of claim 1, wherein said cathode active material layer contains at least 80% by weight of sulfur or metal polysulfide based on the total weight of said carbon or graphite material and said sulfur or metal polysulfide combined.

35. The rechargeable alkali metal-sulfur cell of claim 1, wherein said cathode active material layer contains at least 90% by weight of sulfur or metal polysulfide based on the total weight of said carbon or graphite material and said sulfur or metal polysulfide combined.

36. A method of manufacturing a rechargeable alkali metal-sulfur cell of claim 1, comprising:

(a) providing an alkali metal selected from Li, Na, K, or a combination thereof;
(b) providing a cathode containing a carbon or graphite material having expanded inter-planar spaces, $d_{002}$ from 0.43 nm to 2.0 nm, and sulfur or metal polysulfide residing in said expanded inter-planar spaces; and
(c) providing an electrolyte capable of transporting alkali metal ions.

37. The manufacturing method of claim 36, wherein said step of providing a cathode contains impregnating said expanded inter-planar spaces with said sulfur or metal polysulfide using a vapor phase infiltration procedure, liquid solution infiltration procedure, electrochemical procedure, chemical infiltration and deposition procedure, liquid dipping procedure, or a combination thereof.

38. The manufacturing method of claim 37, wherein said electrochemical procedure includes:
(a) preparing an electrochemical cathode layer containing a carbon or graphite material having expanded inter-planar spaces, $d_{002}$ from 0.43 nm to 2.0 nm;
(b) preparing an electrolyte comprising a non-aqueous solvent and a sulfur source dissolved or dispersed in said solvent;
(c) preparing an anode; and
(d) bringing said electrochemical cathode layer and said anode in ionic contact with said electrolyte and imposing an electric current between said anode and said electrochemical cathode layer, with a sufficient current density for a sufficient period of time to electrochemically impregnate sulfur into said expanded spaces to form said cathode active material layer.

39. The manufacturing method of claim 38, wherein said sulfur source is selected from $M_xS_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

40. The manufacturing method of claim 38, wherein said anode comprises an anode active material selected from an alkali metal, an alkaline metal, a transition metal, a metal from groups 13 to 17 of the periodic table, and combinations thereof.

41. The manufacturing method of claim 39, wherein said metal element M is selected from Li, Na, K, Mg, Zn, Cu, Ti, Ni, Co, Fe, Al, and combinations thereof.

42. The manufacturing method of claim 39, wherein said $M_xS_y$ is selected from $Li_2S_6$, $Li_2S_7$, $Li_2S_8$, $Li_2S_9$, $Li_2S_{10}$, $Na_2S_6$, $Na_2S_7$, $Na_2S_8$, $Na_2S_9$, $Na_2S_{10}$, $K_2S_6$, $K_2S_7$, $K_2S_8$, $K_2S_9$, $K_2S_{10}$, and combinations thereof.

43. The manufacturing method of claim 38, wherein said electrolyte further comprises a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

44. The manufacturing method of claim 43, wherein said solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

45. The manufacturing method of claim 38, wherein said anode, said electrolyte, and said electrochemical cathode layer are disposed in an external container outside of an alkali metal-sulfur cell and said step of electrochemically impregnating sulfur into said expanded spaces is conducted outside said alkali metal-sulfur cell.

46. The manufacturing method of claim 38, wherein said anode, said electrolyte, and said electrochemical cathode layer are disposed inside an alkali metal-sulfur cell and said step of electrochemically impregnating sulfur into said expanded spaces is conducted after said alkali metal-sulfur cell is fabricated.

* * * * *